United States Patent
North et al.

(10) Patent No.: US 9,017,595 B2
(45) Date of Patent: Apr. 28, 2015

(54) CELLULAR CERAMICS APPARATUS AND METHODS OF PRODUCTION

(71) Applicant: JWN, Inc., Atlanta, GA (US)

(72) Inventors: John W. North, Tucker, GA (US); Maurice W. Lashley, Lawrenceville, GA (US); Larry D. Sheppard, Lawrenceville, GA (US)

(73) Assignee: JWN, Inc., Chamblee, GA (US)

( * ) Notice: Subject to any disclaimer, the term of this patent is extended or adjusted under 35 U.S.C. 154(b) by 0 days.

(21) Appl. No.: 14/194,971

(22) Filed: Mar. 3, 2014

(65) Prior Publication Data
US 2014/0175712 A1    Jun. 26, 2014

Related U.S. Application Data

(63) Continuation-in-part of application No. 13/048,962, filed on Mar. 16, 2011, now Pat. No. 8,663,546.

(60) Provisional application No. 61/314,442, filed on Mar. 16, 2010.

(51) Int. Cl.
| | |
|---|---|
| *C04B 33/32* | (2006.01) |
| *C04B 33/30* | (2006.01) |
| *C04B 35/01* | (2006.01) |
| *C04B 35/626* | (2006.01) |
| F27B 9/02 | (2006.01) |
| *C04B 33/135* | (2006.01) |

(52) U.S. Cl.
CPC ............... *C04B 33/323* (2013.01); *C04B 33/30* (2013.01); *C04B 35/013* (2013.01);
(Continued)

(58) Field of Classification Search
USPC .................. 264/654, 660, 679–680
See application file for complete search history.

(56) References Cited

U.S. PATENT DOCUMENTS

| | | | |
|---|---|---|---|
| 2,987,411 A | 6/1961 | Leonard | |
| 4,212,635 A | 7/1980 | North et al. | |
| 4,318,996 A | 3/1982 | Magder | |
| (Continued) | | | |

FOREIGN PATENT DOCUMENTS

| | | |
|---|---|---|
| KR | 10-0809446 | 3/2008 |
| KR | 10-2008-0046481 | 5/2008 |
| WO | 2008/126950 | 10/2008 |

OTHER PUBLICATIONS

International Search Report and Written Opinion in International Application No. PCT/US2011/028589 mailed Nov. 4, 2011, 11 pages.

*Primary Examiner* — Erin Snelting
(74) *Attorney, Agent, or Firm* — Thomas|Horstemeyer, LLP

(57) ABSTRACT

Cellular ceramic materials, for example closed cell glass ceramic materials, for use in construction of buildings comprising a clay material, carbon, and water used to form the cellular ceramic blocks, slabs and beams by expansion of the particles inside the ware. The cellular ceramic materials are produced by first mixing the clay, carbon and about 40% to about 70% water by weight of the clay in the mixture, allowing the mixture to cure, drying the cured mixture, then firing the dried mixture at a temperature and for a period of time sufficient to melt the surface of the mixture. The clay material can be, for example, surface clays, ball clays, kaolin, shale, fly ash and/or bentonite. In another embodiment a mixture of volcanic ash, carbon and water can be formed and layered with the mixture of clay, carbon and water. The cellular ceramic materials are, in most cases, impervious to liquid, are capable of supporting substantial loads in tension and compression without reinforcement, and require no additional insulating material. Such cellular ceramic material may also be used in the construction of buildings with a metal skeleton comprising metal bars forming a structure for supporting the cellular ceramic building material.

19 Claims, 4 Drawing Sheets

(52) U.S. Cl.
CPC ............ *C04B 35/6263* (2013.01); *F27B 9/028* (2013.01); *C04B 2235/422* (2013.01); *C04B 2235/6562* (2013.01); *C04B 33/135* (2013.01); *C04B 33/1352* (2013.01); *C04B 2235/6587* (2013.01)

(56) References Cited

U.S. PATENT DOCUMENTS

| | | |
|---|---|---|
| 5,366,548 A | 11/1994 | Riddle |
| 8,663,546 B2 | 3/2014 | North et al. |
| 2011/0132233 A1 | 6/2011 | Kayali et al. |

CELLULAR CERAMICS APPARATUS AND METHODS OF PRODUCTION

CROSS-REFERENCE TO RELATED APPLICATIONS

This application is a continuation-in-part of U.S. patent application Ser. No. 13/048,962 entitled "CELLULAR CERAMICS APPARATUS AND METHODS OF PRODUCTION" filed on Mar. 16, 2011 and claims the benefit of and priority to U.S. Provisional Patent Application No. 61/314,442, filed Mar. 16, 2010 entitled "CELLULAR CERAMICS APPARATUS AND METHODS OF PRODUCTION", the contents of all of which are incorporated by reference as if fully set forth herein.

FIELD OF THE PRESENT DISCLOSURE

The invention relates generally to materials used for building construction and methods for making building materials, in particular to cellular ceramic building materials, and more specifically to cellular glass ceramic building materials and methods of making cellular glass ceramic building materials.

BACKGROUND

Since 1945, and particularly in the 50's and 60's, there have been efforts to develop a cellular ceramic building material from abundant natural resources, with apparatus and methods for continuous production. The cellular glass blocks on the market since about 1945 initially looked like an acceptable material, but had some drawbacks, including practically no value for protection from fire, and the shapes being extremely friable. Further, the starting material for cellular glass blocks is a borosilicate glass, which is an expensive raw material. This results in a prohibitive cost for heavier and more rugged building blocks.

Certain raw materials, including clays and sands, may be used that are less expensive and found in various areas of the surface of the earth. Other less expensive materials such as fly ash produced as a by-product of manufacturing facilities, from the burning of coal, and trash may be considered and mixed in certain proportions. These cheaper materials may be used to form ceramic blocks, slabs and timbers; however, they require containers of a lesser temperature resistance than the metal alloys used for existing cellular glass blocks. In order to achieve economies of scale and incur minimal material handling costs, materials may be processed in very large quantities requiring significant amounts of heat generation. The existing tunnel kilns used for processing of such materials into ceramic blocks recuperate heat from the flue gas and from the burden (the ware plus the means of containing and supporting in the heat). Presently, the primary air for combustion is brought to the burner at ambient temperature, and a large portion of the fuel consumption is for heating the air to the flame temperature. This leads to large energy consumption costs during the forming process. If the air were introduced into the burner at a high temperature, it would ignite prematurely and unsafely.

One attempt to form cellular blocks is described in U.S. Pat. No. 4,212,635. This patent describes a process in which clay or silica can be mixed with a small amount of soluble carbonaceous material and water to adjust the carbon and moisture content of the clay or silica with the carbonaceous material and water. This mixture is then fired in a kiln to produce a cellulated vitreous refractory material. We have found it difficult to produce suitable product using the teachings of this patent. For example, when using bentonite we had to make a number of changes to the process described in this patent in order to form suitable product, including but not limited to changes in the formulation and changes in the manner in which the formulation is mixed, dried and fired in order to produce a suitable closed cell ceramic material product.

SUMMARY

In one embodiment of the present disclosure an expanded closed cell product is formed, having use for example as a construction material. The closed cell material is a closed cell ceramic material comprised primarily of clay and carbonaceous material. In a particular embodiment, a closed cell glass ceramic material is formed. The clays which have been found to be useful include but are not limited to surface clays, ball clays, kaolin, shale, and bentonite. By surface clays we mean clays mined from the Earth's surface as opposed to surface treated clays. Other clays which are useful for the process will have an ultimate particle size of less than 2 microns, and the ability to sinter into a mass of designated size and structure determined by the desired end product. Some of these naturally occurring clays, found in rock form, may require crushing to a maximum size capable of passing through a 4 mesh screen, typically 0.2 inches or less in diameter. Larger particles may be added for strength or density, however, dependant on the desired product. Many organic clays containing carbon may be used provided the carbon is water soluble and will char upon heating. Preferably, the amount of naturally occurring carbon should not exceed the limits discussed below. In the event that the carbon content in the organic material is less than the desired total amount, carbon can be added. Most any form of carbon can be added that is water soluble and will char upon heating. Suitable forms of carbon include water soluble carbohydrates. Other suitable forms of carbon include carbon black and naturally occurring carbons in surface clays.

In an embodiment of the present disclosure, the expanded closed cell ceramic material product, for example a closed cell glass ceramic material product, is formed from a mixture of clay material, carbon and water. In one embodiment of the present disclosure, the expanded closed cell ceramic material product is formed from a fine mesh clay (the desired mesh dependant on the solubility of the clay in water). The clay is mixed with about 0.5% to about 2.5% carbon and about 40% to 70% water, these percentages being percent by weight of the clay in the mixture or parts per 100 parts of clay. A suitable clay is bentonite composed of about 60% to about 80% silicon dioxide, about 14% to about 26% aluminum oxide, about 2% to about 6% magnesium oxide and 0% to about 11% iron oxide. A preferred fine mesh for the clay is 325 mesh, typically 0.0017 inches or less in diameter. In another embodiment the clay can be a mixture of mesh sizes, for example some being fine mesh and some not fine mesh having a maximum size of 4 mesh. Where the clay already includes some carbon in its natural state the amount of carbon to be mixed with the clay can be adjusted so the combined total amount of carbon in both the clay and mixed in with the clay is about 0.5% to about 2.5% by weight of the clay without carbon.

In one embodiment the closed cell ceramic product of the present disclosure is formed by mixing the clay material, carbon and water, allowing the mixture to cure, then drying the mixture, and finally firing the mixture, for example in a kiln. In one embodiment the closed cell ceramic product of the present disclosure is formed by mixing bentonite, carbon and water to form a mixture of the same which mixture is then allowed to cure, dry and finally fired. In a further embodiment, fly ash is added to bentonite, carbon and water to form said mixture. In yet another embodiment a mixture of clay, for example bentonite, carbon and water, is mixed and a separate mixture of volcanic ash, carbon and water is formed and layered with the mixture of clay, in particular, bentonite, carbon and water, one on top of the other.

In another embodiment of the present disclosure, the various ingredients to form the desired mixture or mixtures are thoroughly mixed together, the aforesaid mixture or mixtures formed into a shape and then allowed to cure for a period of about 4 to about 10 hours, for example overnight. Preferably the mixture or mixtures are mixed and cured for a period of time sufficient to allow dissolved carbon and water to permeate throughout the mixture(s). In one embodiment, a fine mesh carbon material of 4 mesh or smaller, for example 325 mesh or smaller is used to provide better distribution of the carbon material in the mixture and the mixture is cured for about 4 hours to about 6 hours. The cured material is then dried to drive off excess water, preferably to bring the water composition of the mixture down to a range of about 0.5% to about 6% water by weight. The exact percentage of water in the dried cured material is dependant on material being used in the mixture. In one embodiment the drying is achieved by forming the cured material into blocks of about 4 to 5 inches thick and drying the blocks at about 850° F. (454° C.) to about 1000° F. (538° C.), preferably at or around 900° F. for about 4 hours and then allowing the material to cool overnight or longer, preferably cooling to ambient temperature for handling purposes only. In a continuous process it would be expected that the cool down step would be minimal if not eliminated all together by the use of heat resistant equipment to prepare and/or transfer the material for final firing. In one embodiment, the drying temperature produces some charring of the carbon in the mixture or mixtures before they are fired.

The dried material is then fired by, for example, placing it in a kiln having a reducing environment to a temperature related to the melting point of the dried mixture. Optionally, the dried material may be crushed and re-formed into the final desired shape before firing. Preferably, the reducing environment is such that the SiC in the embodiment when heated to above 2100° F. (1149° C.) and up to 2700° F. (1482° C.) produces $SiO_2$ and SiO and ½ $O_2$ are produced and in turn reduced to a gaseous SiO, CO and $CO_2$. In one embodiment the firing occurs in a kiln in which the temperature of the kiln is ramped up over a period of about 7 hours or in production as rapidly as possible without damaging the kiln to a firing temperature of about 2350° F. (1232° C.) to about 2550° F. (1399° C.). The firing temperature is sometimes also referred to herein as the environment temperature or chamber temperature. This ramp up period may be faster or slower depending upon the particular kiln used and also depending upon the temperature to which the material is cooled after drying the material, if cooled at all. With the right equipment it could be possible to bring the temperature in the kiln up to the desired firing temperature within about an hour or so. Furthermore, the actual time of firing the material at the desired firing temperature can vary depending upon the density of the material to be fired. The material is then held at this temperature for a period of time, for example about 15 to about 45 minutes, following which the material is cooled. Preferably, the upper temperature and the time the material is held at this temperature are selected to be sufficient to melt only the surface of the mixture and not the interior of the mixture. In one embodiment, the object of the firing temperature is to sinter the surface of the material and to avoid melting the entire material.

In one embodiment the cooling takes place in the kiln, after the kiln has been turned off, over an extended period of time of about 10 to about 15 hours, or until the interior temperature of the kiln reaches about 300° F. (149° C.). The product is then removed from the kiln and allowed to further cool to room temperature. The final product results in expanded closed cellular ceramic material which may be cut or trimmed to desired dimensions. In a continuous production environment the material could be immediately cooled and processed to desired sizes. The cooling should not occur so quickly, however, as to create fissures or cracking in the material or other structural degradation.

According to certain embodiments of the present disclosure the process of forming cellular ceramic blocks comprises allowing fuel to burn in the open combustion space and the useful heat transfer can absorb high rates of heat generation. For instance, a theoretical flame temperature might be 5,000° F. (2760° C.), but in steady state the combustion zone or chamber is maintained at 3,300° F. (1816° C.), and the radiant heat transfer to the ware at a heat sink temperature of about 3,110° F. (1710° C.), has a regulating effect and defines the heat transfer capacity and fusion in pound per hour. The melting and heat sink temperature of 3,110° F. (1710° C.) is for silica or kaolin. For the preferred pure clay or for fly ash, which have a less pure silica content, a much lower fusion temperature would allow the radiant heat blanket to be comfortably below the 3,300° F. (1816° C.) capacity of the affordable refractory, but a higher combustion chamber temperature ($T_1$) minus heat sink temperature of the ware or product ($T_2$) for high rates of production. Running the conveyor faster in such instances prevents overheating.

Certain embodiments of the present disclosure produce cellular ceramic building blocks, for example closed cell glass ceramic building blocks, for use in construction of buildings comprising clay, carbon, and water used to form the cellular ceramic material comprising ware. The cellular ceramic material is preferably impervious to liquid, is capable of supporting substantial loads in tension and compression without reinforcement, and requires no additional insulating material. Such cellular ceramic blocks may be used in the construction of buildings, preferably with a metal skeleton comprising metal bars forming the building for supporting the cellular ceramic building blocks. The metal skeleton provides additional resistance to tensile and compressive forces. The metal skeleton may preferably be formed from metal bars inserted in grooves formed in the cellular ceramic blocks. In some cases of short lengths, the ceramic member may not need reinforcement. In long members the reinforcement is provided to resist deflection, not for strength. The steel therefore, is designed to carry the full load, allowing use of a light density cellular ceramic building material in such construction. Light density materials result in cost savings and a much better insulation R factor. A fire duration time and temperature is specified for steel protected by specified thickness of concrete. Similar curves specifying fire duration time and temperature may be developed for cellular ceramics. Preferably the scheme is to install steel bars in deep grooves and fill with concrete.

Certain embodiments of the present disclosure provide a process for producing ceramic building materials, for example closed cell ceramic building materials, comprising placing raw materials comprising clay, carbon and water in a container located on a continuous conveyor. The conveyor may preferably comprise an insulating block, the container being resistant to high temperatures and capable of transporting raw materials from an entrance tunnel through a combustion zone and an exit tunnel of an exemplary kiln (see, for example, FIGS. 2 and 3). The temperature is increased as the raw material passes through the entrance tunnel towards the combustion zone and preheating the raw materials with flue gas from the combustion zone when in the entrance tunnel. Ambient air may be drawn into the combustion zone through an induced draft fan located near the entrance tunnel to promote combustion in the combustion zone. The conveyor moves the raw materials through a gas blanket inside the combustion zone providing radiant heat transfer to the raw material and heating the raw materials slightly beyond the melting point of the solid portions of the raw materials. The melting point of some clays is roughly 2400° F. (1315° C.) and the temperature ($T_1$) inside the combustion zone is preferably maintained slightly higher to maintain a heat sink temperature ($T_2$) at about the melting point of the clay mixture entering the kiln.

Thermocouples may be placed throughout the entrance tunnel, combustion zone and exit tunnel to monitor the temperature of the various regions. Gas jets located inside the combustion zone may provide natural gas to the combustion zone, fueling combustion. The conveyor moves the melted raw materials through the exit tunnel, allowing the raw materials to cool and form a monolithic slab. Ambient air may be pulled through the exit tunnel, passing over the melted materials and drawing heat from the material, inducing cooling and slab formation. This heated air may then be reclaimed and fed to the combustion zone to further promote combustion. In one embodiment, this reclaimed heated air can be introduced into the preheat chamber of the kiln, while at the same time introducing gas into the combustion chamber for a controlled efficient burn. The monolithic slab may be cut to the desired shape and size building blocks after cooling and are thus produced in an energy efficient manner using recuperated heat generated by the process.

Density and surface effects of the cellular ceramic blocks and or slabs according to certain embodiments of the invention may vary according to the type of construction intended. By means of common shaker box and compaction equipment, for example, quantities of various compositions of raw materials and of granular sizes can be spread in uniform thickness in various strata to control densities, in combination with carbon loading and depletion, etc. The surface appearances may be left natural, as affected by particle size of the clay, shape, composition, and fired color, etc. More generally, the ware may be configured to a flat surface or in decorative patterns and false joints as desired.

Fabrication of the desired cellular ceramic blocks, whether by sawing motion, shearing, scraping or hole punching, is preferably accomplished by bending and breaking of the cell walls, not by cutting with a sharp edge. The sawing motion not only applies force in more than one direction, but also rakes out the detritus of broken cell walls. A saw is immediately dulled in a few minutes work, but with foam glass continues to "cut" until the roots of the original chill hardened teeth are worn down to a faintly visible indication of the original base. (This would lead to a practice of using cheap metal cutting band saw blades until they are worn out). Costs may be balanced between cheap saws of high-carbon steel versus longer lasting and more expensive and more abrasion resistant replaceable teeth. Early trials seem to confirm that costs and production rates to fabricate ceramic timber and ceramic lumber compare favorably to rates for wood products.

Appropriate tools may be mounted on the conveyor frame moving a slab or block in a straight line, in order to dress a slab to dimensions, and other tools mounted to provide grooves in which to insert steel bars, and other tools to provide ornamental grooves, fluting, and simulated mortar joints, most of the tools being stationary, as the work moves.

Cellular ceramic building materials are preferable to conventional building materials such as concrete for various reasons, including cost savings. The raw material for cement, clay and limestone, costs about the same, per ton, and the cost to grind the clay and limestone raw material, melt to clinker, and grind the clinker to powder, is comparable to the cost per ton of producing ceramic timber. By rough estimate, a yard of concrete coming off the truck costs more than $100.00 and weighs nearly 3500 pounds. One yard of ceramic timber weighs about 600 pounds and cost to manufacture and deliver is less than $44.00.

The cost of form work and of placing steel and concrete, and finishing shows comparable cost discrepancies. The designer and builder have additional opportunities for cost savings and added values. When an exterior wall or roof deck is erected from cellular ceramic building materials, it is already insulated better than common practice where insulation has been added. This also saves original and future roofing (and brickwork or siding and framework for the walls), for protecting the insulation. The above comparison is with concrete. The cost savings may be slightly less, compared with wood frame construction, but still substantial savings exist when compared to structural steel framing in fire resistant construction.

Accordingly it is an object of the present disclosure to provide a cellular ceramic material, for example a closed cell glass ceramic material, suitable for use as a building material and method of making such material.

It is a further object of certain embodiments of the present disclosure to provide a system of material preparation, heating, and harvesting, in order to produce a product substantially cheaper than conventional building materials and having suitable properties for building elements.

It is a yet another object of certain embodiments of the present disclosure to provide a superior system of building design and construction employing the expanded closed cell ceramic product described herein.

Other systems, devices, features, and advantages of the disclosed cellular ceramic materials and methods of making said materials will be or will become apparent to one with skill in the art upon examination of the following drawings and detailed description. All such additional systems, devices, features, and advantages are intended to be included within this description, are intended to be included within the scope of the present disclosure, and are intended to be protected by the accompanying claims.

BRIEF DESCRIPTION OF DRAWINGS

Many aspects of the present disclosure can be better understood with reference to the following figures. The components in the drawings are not necessarily to scale, emphasis instead being placed upon clearly illustrating the principles of the present disclosure. Moreover, in the drawings, like reference numerals designate corresponding parts throughout the several views. While exemplary embodiments are disclosed in connection with the drawings, there is no intent to limit the present disclosure to the embodiment or embodiments disclosed herein. On the contrary the intent is to cover all alternatives, modifications and equivalents.

DETAILED DESCRIPTION

Figure 1:
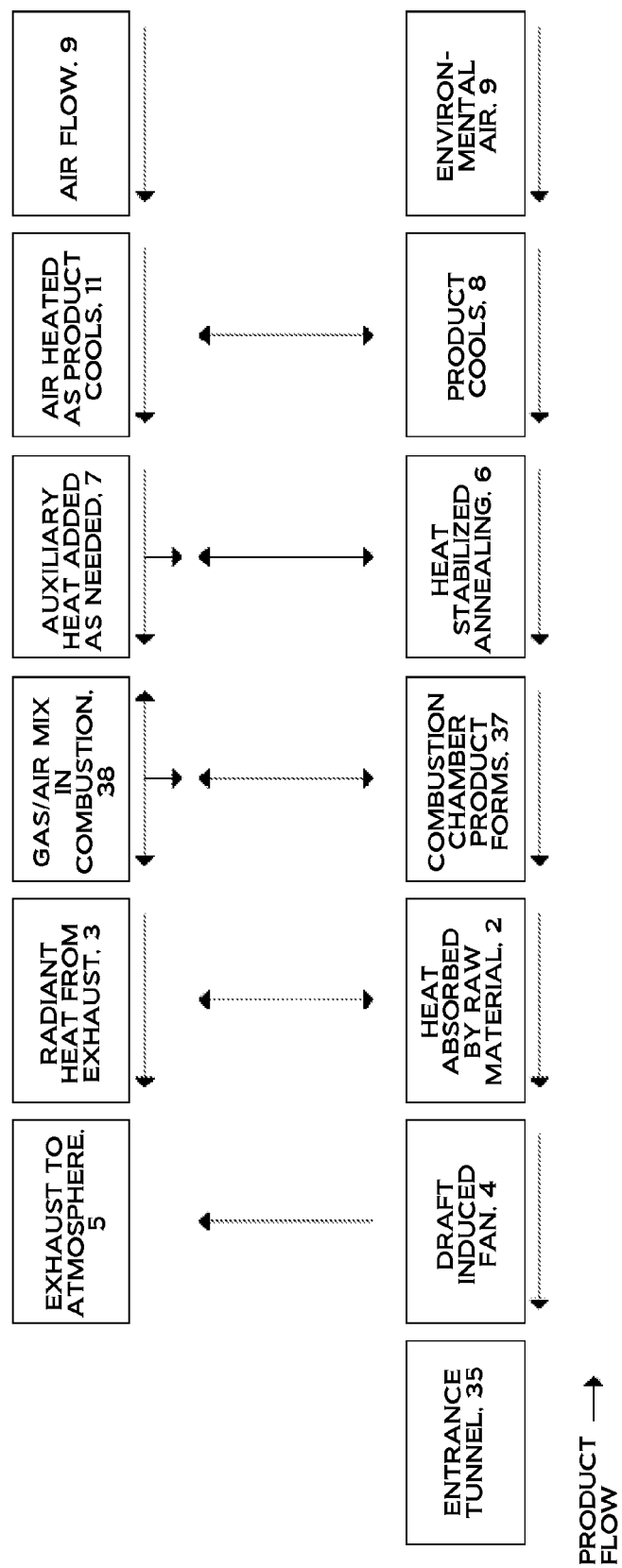
FIG. 1 is a flow chart showing a process according to certain embodiments of the invention.
Figure 2:
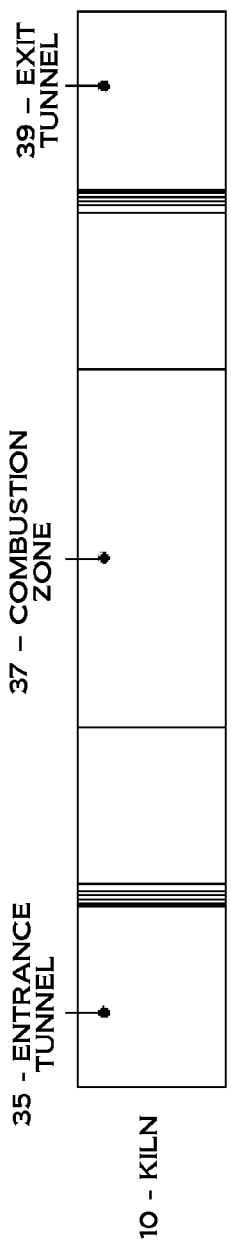
FIG. 2 is a top view of a kiln according to certain embodiments of the present disclosure.

Disclosed herein are various embodiments of cellular ceramic materials and methods of making said materials. Reference will now be made in detail to the description of the materials and embodiments as illustrated in the drawings, wherein like reference numbers indicate like parts throughout the several views. While several embodiments are described in connection with these figures, there is no intent to limit the present disclosure to the embodiment or embodiments disclosed herein. On the contrary, the intent is to cover all alternatives, modifications, and equivalents.

The expanded closed cellular ceramic material and method of making the material of the present disclosure overcome the above described disadvantages. In one embodiment, the expanded closed cellular ceramic material of the present disclosure is formed from a mixture of a clay material, carbon and water which components are mixed and the mixture allowed to cure. In a particular embodiment a closed cell glass ceramic material is formed. The cured mixture is then dried. After drying, the mixture is fired, for example in a kiln, such as described below, for a period of time and over a temperature range so as to produce an expanded closed cellular ceramic product which is then cooled and after cooling may then be cut or trimmed to the desired measurements.

Suitable clay materials include surface clays, ball clays, kaolin, shale, and bentonite. Clays suitable for forming the present closed cellular ceramic material preferably are presented in particle form and have a particle size capable of passing through a 4 mesh screen, typically 0.2 inches or smaller. Naturally occurring clays, for example, those formed in rock form may require crushing to attain the preferred particle size.

In another embodiment, the clay material is a fine mesh clay material. An exemplary mesh is 325 mesh. An exemplary clay material is bentonite having about 60% to 80% silicon dioxide ($SiO_2$), about 14% to about 26% aluminum oxide ($Al_2O_3$), about 2% to 6% magnesium oxide (MgO) and 0% to about 11% ferrous oxide ($Fe_2O_3$). About 100 pounds of the fine mesh clay material can be mixed with about 0.5 to 2.5% carbon and about 40% to 70% water per 100 pounds or parts of clay material.

In another exemplary embodiment, the clay material need not be all 325 mesh. It can be a mixture of mesh sizes, some fine mesh of about 325 mesh and some larger mesh, for example, 4 mesh or smaller.

In another exemplary embodiment of the present disclosure, the expanded closed cell ceramic material of the present disclosure is formed by mixing the carbon into warm water until fully dissolved. The carbon mixture or solution is then combined with the clay material in a fashion to dampen the entire mixture of clay and carbon while being agitated and folded until thoroughly mixed. The mixture is then allowed to cure, for example, by covering the mixture with plastic and allowing to cure overnight.

In one embodiment, a suitable carbon material is a form of carbon that is water soluble and will char upon heating. Exemplary carbon materials include water soluble carbohydrates. Other suitable carbon materials include carbon black and naturally occurring carbons in surface clays. Preferably the carbon material is mixed with the water and that clay material and cured for a period of time to allow dissolved carbon and water to permeate throughout the mixture. In one embodiment, the curing time may be about 4 to about 10 hours. The curing time may be dependent, however, on the size and shape of the wet mixture. In another embodiment the mixture may be cured for about 4 hours to about 6 hours.

The cured wet mixture is then dried, for example, by placing it in a kiln to drive off excess water. An exemplary drying temperature is in the range of about 850° F. (454° C.) to about 1000° F. (538° C.). Preferably the drying temperature also produces some charring of the carbon in the mixture before the mixture is fired. In an exemplary embodiment the cured wet mixture is formed into blocks of about 4 to 5 inches thick and dried at or around 900° F. and held at that temperature for a period of time, for example, for about 4 hours. The dried material may then be allowed to cool to ambient temperature. This cooling step, however, is convenient for handling the dried mixture and transferring it to the firing equipment and may be eliminated where heat resistant equipment is available to transfer the dried mixture directly to the firing equipment.

Firing of the dried material can take place in a kiln, such as described below. The dried material can be placed on high temperature trays, with for example parting material on the sides and bottoms of the trays. In one embodiment, the dried mixture may be crushed and loosely packed in the trays to a desired depth, for example 3 inches, and at whatever width is desired upon completion. The kiln is then fired to establish a reducing environment. In one embodiment the environment or firing temperature of the kiln is directly related to the melting point of the mixture to be fired. An exemplary firing temperature is in the range of about 2350° F. (1232° C.) to about 2550° F. (1399° C.). The kiln temperature can be ramped up over a period of time, for example, about 7 hours, to reach the desired peak temperature. This ramp up period may be faster or slower depending upon the particular kiln used. The ramp up period will be less if the dried material is not cooled but instead transferred directly to the kiln. The ramp up of the temperature should not be so fast as to damage the kiln. When the mixture reaches the desired melting temperature, the kiln environment ramp up temperature is slowed to maintain a constant product and temperature environment. In one embodiment the desired peak firing temperature is sufficient to melt only the surface of the shaped mixture and not the interior of the mixture. The object of the firing peak temperature is to sinter the surface of the material mixture and to avoid melting the entire mixture, in particular the interior of the mixture. An exemplary sintering period is about 15 to about 45 minutes at this kiln environment temperature, after which the kiln burners are extinguished and the product and the material may be cooled in the kiln.

In one embodiment the kiln is allowed to cool for about 10 to about 15 hours or until the interior temperature of the kiln reaches 300° F. (149° C.). The fired material product is then removed and allowed to cool to room temperature. The final expanded closed cell ceramic product material may then be cut or trimmed to desired measurements. In one embodiment, a closed cell glass ceramic product material is formed.

The above described process for preparing the expanded closed cell ceramic material of the present disclosure is a batch process. The process for preparing the present material need not be limited to a batch process and may also include continuous processes. In an exemplary continuous process, for example, the dried mixture may be transferred directly into a kiln without cooling the dried mixture. Further, in a continuous process, a ramp up period for bringing the kiln temperature up to the desired peak temperature would not be needed. In an alternative embodiment, for example, a kiln might be provided having sequentially increasing temperature zones, leading to a temperature zone maintained at the desired peak temperature, using suitable heat resistant conveying equipment to transfer the material through the kiln and to a cooling station and ultimately to a cutting or trimming station.

According to certain embodiments of the present disclosure, the present cellular ceramic material is produced using a kiln such as that illustrated in FIGS. 1-5. The exemplary kiln 10 is provided with a continuous container 15 comprised of separate lengths of metal troughs, also referred to as product troughs, with a flange 20 turned up on each of two opposite sides, and one edge turned down for a flange for a sand trap, moves on a conveyor. The lengths of the trough are rigidly coupled with a coupling device which can be disengaged. Inside each flange 20 is a wall of insulating refractory material 40, such as a refractory parting mat. The bottom surface of the trough between the walls is lined with a substantial thickness of refractory insulation, comprising a monolithic base for the container in which to fuse a monolithic slab of continuous length. Certain embodiments enable continuous progress, or intermittent movement, cutting to length and harvesting without halting the movement; also facilitating the measured flow of combustion air and gasses. An alternative procedure is for the raw material feed to be formed into tiles and placed on top of high temperature refractory grains, which grains serve as the parting material.

In some embodiments, the container is charged with a measured thickness of the aforementioned dried mixture, which is fused from the top down, leaving a residue of unfused material at the bottom, as a parting, in order for the product to be harvested. The raw ceramic body may be all in small particles, tiles, or other sizes and shapes limited only by the desired end result. Heating and cooling is highly recuperative. By regulating the speed of the material through the kiln, fast heating through a great thickness is effected on the product. Therefore, heating the gas blanket to nearly 2400° F. (1316° C.) to 3300° F. (1816° C.), will supply heat to the successive surfaces of active fusion, in proportion to $T_1^4$ minus $T_2^4$ where $T_1$ is the gas blanket temperature in the kiln and $T_2$ is the melting point of the ceramic body (as each successive surface is melted it no longer absorbs radiant heat but the heat passes through to see $T_2$ in the next surface). The limit on $T_1$ temperature is the limit on the refractory. Much greater heat transfer potentials are available with clay or fly ash than with pure silica. The heat potential may be increased by high temperatures for $T_1$.

According to certain embodiments of the present disclosure, as shown in FIG. 1, raw product enters the kiln 10 at the entrance tunnel 35, having been placed into a refractory ware on a continuous plate capable of producing the size of finished material desired. It is moved inside the kiln, facilitated by the use of rollers 30 being turned by a variable speed motor driven chain or through a force created by hydraulic push rods. The mixture (raw material) enters the preheat zone 2 and absorbs radiant heat 3 drawn from the exhaust of the combustion zone 37 by one or more draft induced fans 4 which exhaust is ultimately exhausted to the atmosphere 5, and in some cases auxiliary heaters. Continuing into the combustion zone 37, the mixture forms into a desired material and continues into the annealing zone 6. The heat can be maintained by an auxiliary heater 7 if necessary to control the environment if needed for a specific product. The new product continues to be cooled 8 to a safe handling temperature. While these actions are taking place, ambient or environmental air 9 is being drawn into the products exit end of the tunnel 39 by a variable speed fan located at the entrance of the tunnel 35. This fan speed is matched to the amount of air required in the combustion zone 37 and the amount of fuel, for safe stoichiometric air to fuel ratio (AFR) for safe combustion. As the air comes into the tunnel it is warmed 11 by the heat of the new product. When entering the combustion zone 37 the air is above 1500° F. (816° C.). It will then mix 38 with the fuel being fed into the chamber with regulated nozzles for a spontaneous ignition. Care must be taken to have correct mixtures available for the combustion zone area. Each product requires a different set of parameters for correct heat sink features. The exhaust air continues toward the draft fan 4, warming the raw material and is forced out into the atmosphere through proper exhaust vents 5.

According to certain embodiments of the present disclosure, where bottom heat is desirable, refractory plates may be supported by posts on a continuous container built to be heated somewhat as in a conventional kiln, except that the more full recuperation of the heat is utilized, FIG. 1, and optionally the long and continuous lengths are produced.

A stack furnace may be provided, somewhat similar to a burn-out furnace. A conveyor 28 preferably feeds into the stack furnace. The conveyor is supported by rollers 30 dispersed along the length of the kiln. The stack furnace is useful in burning out the excess carbon in fly ash, if used, and supplying useful heat to the kiln line. The stack furnace may be substituted for a major portion of the pre-heat section of the kiln line. Loading the container at some distance from the combustion chamber allows some cooling of the flue gasses, preventing overheating and stickiness to impede pouring and leveling of the raw materials.

Certain embodiments of the present disclosure include methods of bloating and shaping the plates or slabs of ceramic building material. The gassing and cellulation is explained somewhat in the prior art, but further details are pertinent to the extreme sizes in 3 dimensions, and in continuous flow of production. A container may be provided and a charge of the aforementioned dried material leveled to a desired depth which flow down a stack or chute to the moving container below, to be screeded to a specified level by a horizontal bar (not shown), as the container advances along the conveyor, enabled by the pourable shapes of the dried material. If necessary the dried material may be crushed to render it flowable or pourable.

In an exemplary method, dried material advances through increasing temperatures of an environment of flue gasses through an entrance tunnel 35. The spaces between the particles of dried material allow the circulation of flue gasses and consequent transfer of heat, tending to seal the pores of the material, even as the high temperatures tend to cause the water vapor and other oxidizing gasses, to react to provide additional gasses. Ostensibly, there are stages in the process where the pores are open enough to allow fast escape of gas, so the effect is to deplete the carbon content, with little bloating. At a later stage the pores are so fine that some loss-on-ignition gasses are trapped long enough to become completely sealed in by fusion. Implausible as it may seem, ordinary gauges allow the repeatability of values over wide ranges of density of the product, well within commercial needs.

According to certain embodiments of the present disclosure, a stack furnace maintains the flow of dried material, preheated below sticking temperatures and further heated in the shortened horizontal preheat section. As the particles in the top layer are heated these particles soften and expand to form a layer which effectively seals off the top by filling and welding, eventually filling and welding throughout the thickness. At times, a thick block is found to be expanded and sinter-welded to a monolith, but with slightly permeable cell walls and lacking in the glassy look of the completely fused product. This happens when the operating temperature $T_1$ is insufficient to fuse all the diverse particles to the glassy state, the body remaining essentially opaque such as used in the production of alumina silicate bodies which foam and mature at about 3300° F. (1816° C.), but useful in service as a furnace liner facing an environment of up to 3600° F. (1982° C.). Certain other clays and embodiments will provide products of the present disclosure, as described below.

The present cellular ceramic body or building materials may be prepared by a process involving heating and cooling. The ceramic body is found with, or provided with, materials which react upon heating in order to produce gas. In an exemplary embodiment, the aggregate body may contain iron oxide and carbon content, or carbon may be added to reduce or partially reduce the iron oxide. With bodies of relatively pure oxides, such as silica and alumina-silicas, a small addition of carbon, hydrocarbon, or carbides reacts with silica to produce $CO_2$. For the preferred exposure to the products of combustion, the dried material is pelletized or crushed and shaped into units of approximately uniform sizes. As the dried material is measured and poured into the train of pans, it is leveled to a thickness that will produce the designated thickness of ware plus sufficient body to remain unfused, in order to release the ware for harvesting. According to certain embodiments of the invention a parting layer of mineral granules or grains are provided rather than extra body. The dried material can be shaped into blocks, bricks, flat strips and timbers of various lengths.

Figure 3:
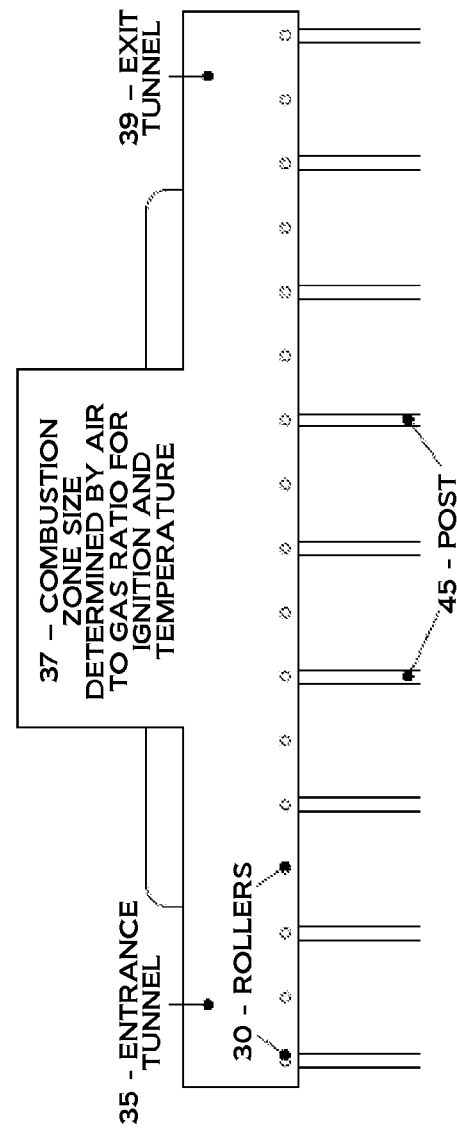
FIG. 3 is a side view of a kiln according to certain embodiments of the present disclosure.
Figure 4:
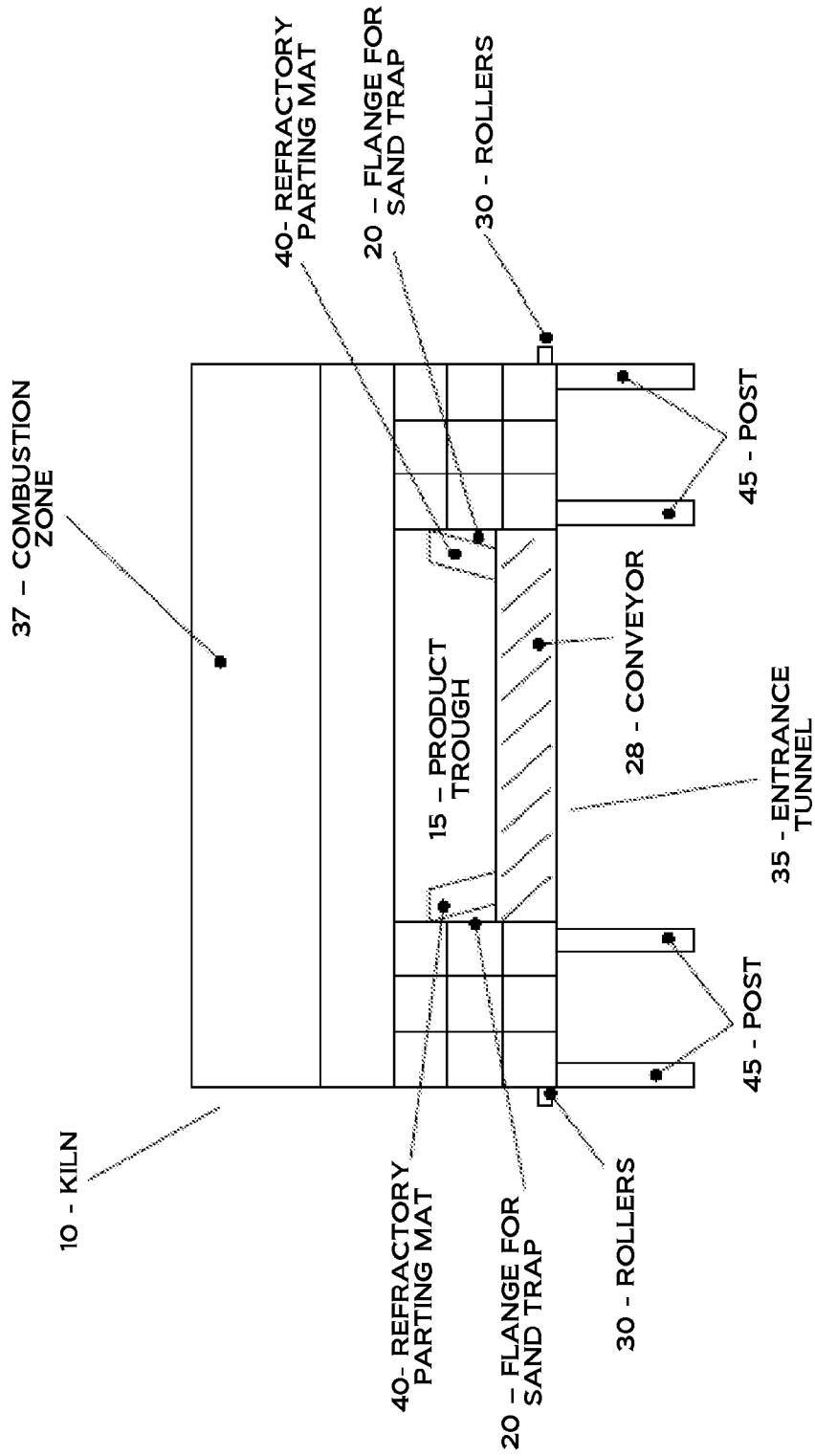
FIG. 4 is a front view of a kiln according to certain embodiments of the present disclosure.
Figure 5:
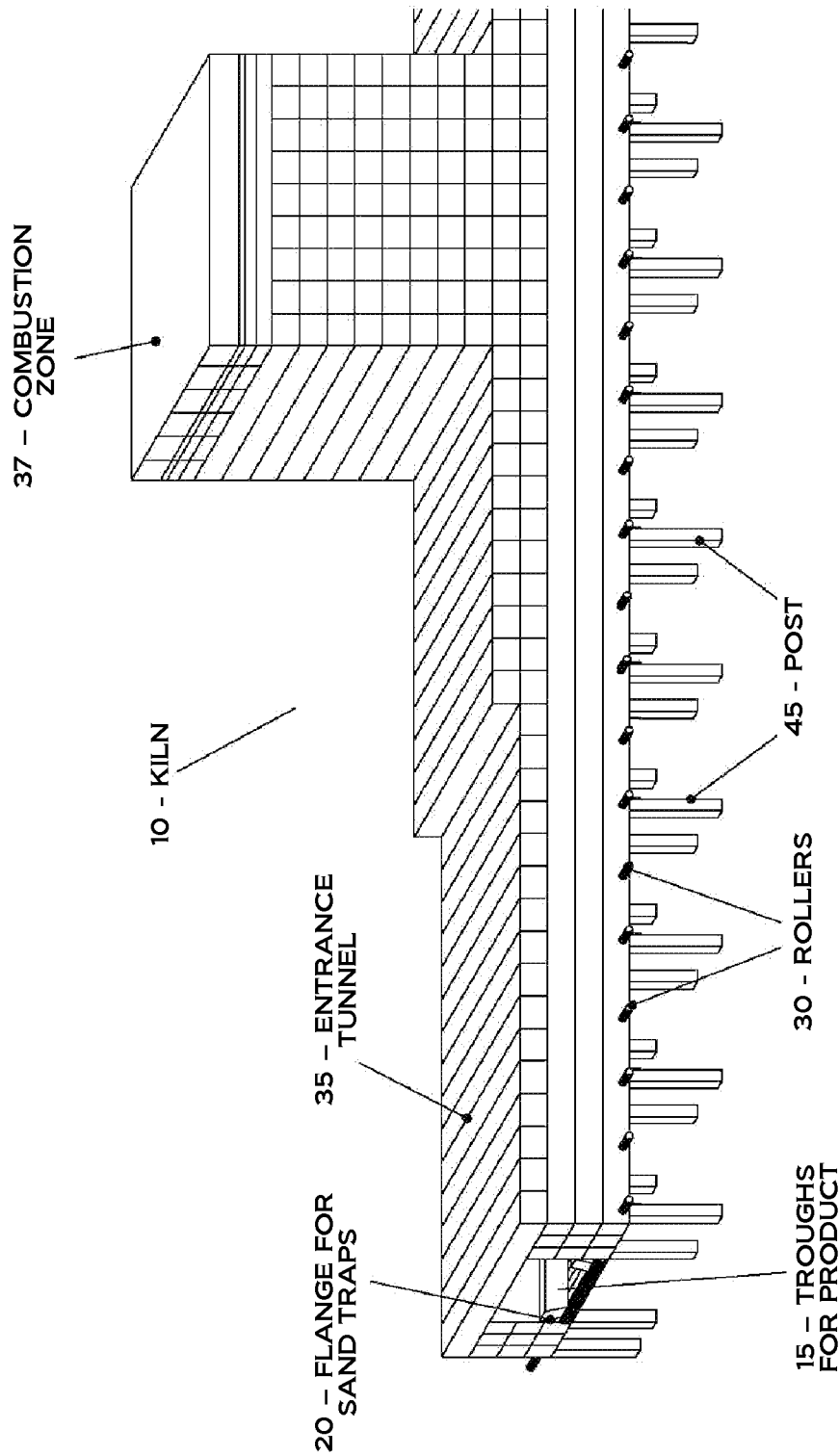
FIG. 5 is a perspective view of a portion of a kiln according to certain embodiments of the present disclosure.

Certain embodiments of the present invention allow for the passage of the containers through the kiln is enabled by using large containers, capable of presenting the shaped ceramic body in continuous motion, passing though the gas blanket which gasses may include diatomic gasses which are highly capable of absorbing and emitting radiant heat. The container containing raw materials passes through the entrance tunnel 35 where it is preheated and enters combustion zone 37. The open housing of the combustion zone 37 comprises the gas blanket above. The size of the combustion zone can be determined by the air to gas ratio for ignition and temperature. This is the stoichoimetric air to fuel ratio (AFR) desirable for complete combustion. The combustion zone 37 must be large enough for the raw product to form and cellulate according to the speed of the material as it passes through the combustion zone. Once the ignition has occurred the AFR may be adjusted plus or minus approximately 10% to maintain either a reducing or oxidizing environment for proper formation of the product. In FIG. 3, it should be noted here that the size of the combustion zone 37 may vary in accordance with the material and product being desired, the volume of such will also affect the AFR. FIG. 5 also shows a rather large combustion zone 37 in which a large gas blanket is desired for formulation of products varying in density and length. The heat transmitted to the ceramic body raw materials is higher with greater gas blanket thickness. If the target of the radiation is comprised of crystalline solids, then the ceramic body fuses a tiny increment of thickness on the surface of the body, to glass which is highly transparent to radiant heat. Silica solids, notably sand, may be fused rapidly with the gas blanket at 3,300° F. (1815° C.), but normally cooled rather fast, in order to prevent the glass from crystallizing and having slightly greater thermal expansion, as formulation and heat treatment produce 3% to 8% of very fine crystals, which essentially block radiant heat. With thermal expansion increased by less than 10% or 0.0000004 inches per inch, kaolin also fires to glass but crystallizes sufficiently in cooling to near minimum thermal conductivity. The rate of heating the ceramic body depends on the gas blanket $T_1^4 - T_2^4$, where $T_2$ is the melting point of the ceramic body and $T_1$ is the gas blanket temperature. Increasing $T_1$ increases the heat transferred to the ceramic body. After the ceramic body gets to the melting point, added heat results in more pounds melted, without rise in the body temperature. As all the latent heat supplied to an increment of thickness, the increment becomes glass and the heat passes through to the raw layer below. The rate of heat transfer will change with $T_1$, type of material and other factors. The hand books can be interpreted to confirm transfer of approximately 20,000 BTU's per square foot per hour.

In the common use of conventional kilns, formed ware is subjected to hot gases, in forced and/or natural convection, with time for heat to equalize throughout thick shapes. The time to dry, fire and cool may vary from less than 8 hours to more than 6 weeks. In bricks, for instance, which are stacked high without much separation in the stacks and between stacks, the clay is usually tolerant of variations in time and temperature. For cellular glass, temperatures and time at specified temperatures are closely controlled, in order to control the density and strength of the cellular glass.

Ambient air may be drawn into the kiln through exit tunnel 39, the combustion zone 37, and the entrance tunnel 35 due to the pressure differential caused by an induced draft fan located near the opening of the entrance tunnel 35. The conveyor moves the raw materials through a gas blanket inside the combustion zone providing radiant heat transfer to the raw material and heating the raw materials slightly beyond the melting point of the solid portions of the raw materials. In the case of silica the melting point of the dried material is roughly 3250° F. (1788° C.) and the temperature inside the combustion zone is preferably maintained at approximately 3300° F. (1815° C.). Thermocouples may be placed throughout the entrance tunnel, combustion zone, and exit tunnel to monitor the temperature in the various regions. Gas jets may be located inside the combustion zone and provide natural gas to the combustion zone, fueling combustion.

The conveyor 28 moves the melted materials through the exit tunnel 39, allowing the materials to cool and form a monolithic slab. Ambient air may be pulled through the exit tunnel, passing over the melted materials and drawing heat from the melted materials, inducing cooling and slab formation. The heated air may than be fed into the combustion zone to further promote combustion. The monolithic slab may be cut to the desired shape and size building blocks after cooling, producing building materials in a cost effective, energy efficient manner using recuperative heat generated by the process.

In certain embodiments of the present disclosure, slabs are, for instance, 4 feet wide and up to more than 8 inches thick. If the combustion zone 37 is heated to just above the fusion temperature, it might take hours to heat the slab almost to the environment temperature, ostensibly producing great variations in density. In some embodiments of the invention, highly useful ware may have a designated density with acceptable tolerances, over a great thickness but it will be useful, also, to provide slabs with a small depth of greater density and hardness. Factors that can be varied to some degree and, combined, affect density overall or stratum by stratum.

The proportion of carbon allowed to contact the metal oxide that reacts at the designated temperature is affected by the formula proportions, minus the depletion by premature reaction. Pellets or other shapes and sizes, may be progressively sintered while the flue gas diffuses into the more accessible surfaces. As the reaction temperatures are reached, and the shape only partially sintered, the carbon is depleted by reaction with any $O_2$ in the flue gas or by water vapor from the flue gas and from calcining of the body. All is progressive with the temperature rise. The amount of gas captured, and the resulting density may be determined by experiment with the formulation and the firing conditions.

Some embodiments provide a means to fire by convection, without the excessive temperature of radiant heat firing, by supporting containers, other furniture and ware to leave space above the car top, also raising the roof as necessary, making the apparatus act as a conventional kiln; except that essentially all of the combustion air passes over the heated ware, heating the air to a temperature near to the temperature of the kiln. In the conventional kiln, part of the air necessary to cool the ware is drawn off to dry the ware in a manner which wastes considerable heat, but avoids preheating the air and causing premature combustion. In conventional burners, if the fuel gas is mixed with heated air to the burner it causes damaging combustion in the metal burner but when cold air becomes the principle air for combustion, heating air to the combustion temperature requires more fuel. In using the invention to fire formed ware some of the hot air stream comes under the ware, where some of the fuel is injected.

According to some embodiments of the present disclosure, sensors may prevent delivery of fuel through gas jets except when the air is well above the ignition temperature (similar to common safety devices in conventional gas-air firing). It is recommended to provide a conventional gas-air system for start-up and for temperature irregularity at the end of a run in annealing.

According to some embodiments of the present disclosure the apparatus for producing ceramic building materials is provided with a stack furnace, in lieu of the major part of the preheat portion of the tunnel. The dried material is shaped into a form firm enough to resist significant abrasion in conveying and feeding. The charge is maintained in the stack to a designated height. At the bottom of the stack the continuous container is moving under the stack's contents, which settle into the container and are raked off by a screeding bar to a designated level. The container proceeds into a relatively short tunnel, in which the flue gas loses some temperature and avoids overheating in the stack (cold air may be injected into the tunnel if deemed necessary).

Particles of the dried material of pourable sizes and shapes can be easily distributed over a container area of unlimited size. The material may be formed of wet or damp mixes with soluble carbohydrates in water. In drying, excess soluble carbohydrate is brought to the surface of any object, and deposited. In certain embodiments of the present disclosure, the hot flue gasses tend to react with the carbon before sintering traps all of the resulting gases. This becomes a factor in experimental formulation. Preheating is facilitated by convection and radiation to the large surface areas and short internal distances from the surfaces of the material.

Among the variables in the degree of burnout of carbon are the particle size and shape of the material and the velocity of the ceramic charge passing through the process. Pulverized clay as the raw material may be used to form acceptable material for the kiln. For example, to 325 mesh clay, add water containing a solution of carbon. The body is formed and dried to produce the material for the kiln. A water solution of carbon black may provide the desired carbon, but the present example will be with a carbohydrate solution that will dry and char to leave carbon on the surface of the particles of the clay. Very fine particles of ceramic raw materials sinter at much lower temperatures than coarse particles, and this may be the means by which particles of carbon are sealed in before the carbon silica reaction produces $CO_2$, with SiO and CO also being held in contact with silica in the clay until the reaction with carbon is completed to $SiO_2$ and $CO_2$.

High melting clays, such as kaolin or fire clay, melt at about the same temperature as silica, and are fired much the same way. In both the silica and the clay, excess carbon addition anticipates some depletion of the carbon by infiltration of air and by combustion gases, which include water, which also combines with carbon to produce gases that are mostly dispersed before being trapped by the sintering and fusion. The amount of gas to be contained in the product can be made sufficiently repeatable, for practical purposes.

If the raw material used to produce ceramic building materials is iron bearing surface clay, or the like, the process is similar, except that the carbon reduces iron oxide instead of silica, and sinters and fuses and reacts at lower temperatures, fortuitously somewhat compatible, and repeatable. Fly ash is essentially clay which has been heated and dehydrated. The excess carbon left by firing coal in accordance with air pollution regulations, leaves unburned carbon in the ash, which carbon may cause excess gassing and unacceptable cellulation in bloating. Other formations using fly ash in a mixture address the need to remove the carbon from the surfaces of the particles in order for the ash to be used in concrete and resin mixes. A somewhat similar burn-out occurs during the process of cleaning the fly ash, as burn-out is accomplished in the preheat stack furnace, with some residue of the carbon left embedded in the coarser particles of fly ash, or found deeper in the mixture.

With some carbon remaining for gasification with controls, some desirable densities can be achieved in a variety of products using these waste materials. The variations in particle size of the carbon content produce variations in cell sizes, but these variations may be acceptable. Note that the carbon reaction possibly may be with other metal oxides found in some earths such as manganese oxides, or by reducing $SiO_2$ in the mix.

The kiln having elevated carrier plates, preferably commercially available plates in the available small sizes with 3,760° R capability or higher, are elevated on posts 45 to one level, to make one continuous deck, on each section. On each of the section sized decks, a layer of ceramic particles and a few layers of paper are spread, and a boundary form placed, to confine a slurry to form a section sized or longer plate, to be dried and fired, but not fused. The slurry may be optionally foamed and result in a very large insulating deck plate.

In firing, the paper chars and burns, leaving the plate to rest on a parting layer of dry ceramic particles. The resulting plates can be used to form plates for future kilns, providing the option to produce solid or cellulated plates as wide as the container and as long as one section or as a number of sections in train. For example, a mixture of kaolin and alumina may be used to make a plate.

To progress to higher temperatures; firing, but not fusing, carrier plates of zirconia content. The kiln products will be such as high alumina and high zirconia insulating refractories, cellulated by fusing or by aerating the slurry; capable of resisting up to 5,000° R.

In order to make a higher temperature deck plate it is not necessary to cellullate or to fuse. Adequate strength results from firing to the capability of the first kiln. Likewise the side brick for the container and the shapes for the tunnel walls and roof can be made at a temperature below their use capability. Cellulating is obtained by: (1) sintering to capture $CO_2$ gas in firing, or (2) making the body in the form of a slip or slurry and aerate into a foam and then drying and firing. By these procedures a high alumina class of insulating fire brick can be produced to make a kiln to produce construction material to build additional kilns. The high alumina kilns can fire ware of zirconia up to the kiln's capability. This ware formed as decks, cellulated shapes for walls and roof can possibly attain a temperature capability much higher, in the neighborhood of 5,000° R.

Products acceptable for commercial sale as well as for internal uses can be made as described. If further firing is desired before selling or using, the ware can be fired to about 5,000° R in the kilns made of the ware as described above. This will provide the capability to try zirconia with a small portion of bonding material, such as kaolin, to cellulate below the melting point of zirconia but by carbon reaction to reduce the kaolin. Up-grades with other refractory ceramics, and cellulation, can be accomplished in this same manner.

After the ceramic materials have been produced, the materials may be formed into blocks as desired. With the penetration of radiant heat, slabs of 8 inches or more in thickness are very practical to produce. Various widths and lengths, are squared up and cut to dimensions, much as a tree trunk is cut into timber or lumber. Sawing, shearing, planing, punching, etc., are by breaking of the thin walled bubbles, by wear resistant tools, which do not need to be sharp. Fluting, grooves for wiring, and for small pipes, and simulated mortar joints, and decorative designs are easily accomplished, by machines or manually.

Raw materials such as kaolin, or other "fire clay", may be used to make insulation boards at about 10% of the present cost per cubic foot of insulating fire brick. The same strength and hardness can be achieved with about half the weight, with the R value (resistance to heat flow) about twice as much as the heavier aerated concrete. Other convenient materials, such as iron bearing brick clays and fly ash, of similar strength, typically cost slightly less, and serve as well, for general building blocks.

Various factors affect density of the ceramic materials overall and in various strata, including carbon content of the raw materials. These factors can be controlled to make the slab without noticeable variations; but a dense surface stratum on a low density slab may easily be achieved.

Typically, the block or slab is formed by the expansion of the material particles filling any open spaces between the particles and pushing against the sides, while pushing upward to increase the thickness of ware. The expansion occurs as (1) gases are generated by the reaction of carbon heated in contact with a metal oxide (2) as the temperature rises the particles with finer particle sizes sinter first, which slows the escape of gas and traps some gas. Ideally, all cells will finally be sealed completely, but near perfection and a less shiny, glassy look and some permeability is accepted for high temperature service. Coatings for appearance and toughness will further insure against damage from weather. It is usually found that clays with very fine particle sizes will sinter well, but coarse clays and gritty particles need help from fine clay or colloidal sized particles, or by solutions of fluxes. In lieu of coatings the material may also be layered with another clay material for strength, density and looks, or glazed for color and effect.

These expedients have been found to give good variability and repeatability with ordinary commercial controls of combustion air volume and process temperatures. With flexibility in loading and formulation, density variations can be manipulated to provide tough surfaces on lightweight interiors (low density for low cost and high insulating value).

EXAMPLE 1

A cellular ceramic material, in particular a closed cell glass ceramic material, of the present disclosure was made by 1) mixing bentonite, carbon and water, 2) curing the mixture, 3) drying the cured mixture, and 4) then firing the dried cured mixture. In particular, 100 pounds of 325 mesh bentonite were mixed with 1.5% carbon and about 50% to about 60% water per 100 pounds of bentonite. The carbon was mixed in exact proportions into warm water until fully dissolved. This carbon solution was mixed with the bentonite in a fashion to dampen the entire mixture while being agitated and folded. The resultant material mixture was covered with plastic and allowed to cure overnight.

The cured wet material was placed in the above-described kiln. The kiln temperature was gradually ramped-up from ambient temperature at a rate of 300 degrees per hour. When the kiln temperature reached 900° F. (482° C.), the temperature was held for 4 more hours for a total of 7 hours of drying, including ramp-up time before turning off and allowing the material to cool.

After the material was cooled for handling, the material was placed on high temperature trays with parting material on the sides and bottom of the trays. The material was loosely packed in the trays to a depth of three inches at whatever width was desired upon completion. The kiln was turned on to ramp-up to 500-550° F. in the first hour. The kiln was then regulated to a controlled ramp of 250° F. per hour for 6 hours to an environment temperature of approximately 2000° F. (1903° C.). The kiln was then fired to establish a reducing environment, ultimately taking the environment temperature of the kiln to 2200° F. (1204° C.) to 2800° F. (1538° C.) at a rate of 300° F. to 350° F. per hour. When the heat sink temperature of the material was such that it penetrated the surface of the mixture, in the range of approximately 2360° F. (1293° C.) to 2450° F. (1343° C.) (as read by an IR temperature gun, with an emissivity setting of 0.95), the kiln environment temperature was slowed to maintain a constant material and environment temperature at a rise of no more than 45° F. per hour. After about 30 minutes at this kiln environment temperature the material was cooled at a rate to insure appropriate and conventional tempering after which all kiln equipment was turned off and the kiln was allowed to cool for 10-15 hours, or until the interior temperature of the kiln reached 300° F. (149° C.). The material was then removed and allowed to further cool to room temperature outside of the kiln. The final cooled closed cell ceramic material was then cut or trimmed to the desired dimensions.

EXAMPLE 2

A cellular ceramic material, in particular a closed cell glass ceramic material, of the present disclosure was made by 1) mixing bentonite, fly ash, carbon and water, 2) curing the mixture, 3) drying the cured mixture, and 4) then firing the dried cured mixture. In particular, 75 pounds of 325 mesh bentonite and 25 pounds of fly ash were mixed with 1.0% carbon and about 50% to about 60% water per 100 pounds of mixture. The carbon was mixed in exact proportions into warm water until fully dissolved. This carbon solution was mixed with the bentonite and fly ash mix in a fashion to dampen the entire mixture while being agitated and folded. The resultant material mixture was covered with plastic and allowed to cure overnight.

The cured wet material was placed in the above-described kiln. The kiln temperature was gradually ramped-up from ambient temperature at a rate of 300 degrees per hour (149° C. per hour). When the kiln temperature reached 900° F. (482° C.), the temperature was held for 4 more hours for a total of 7 hours of drying, including ramp-up time before turning off and allowing the material to cool.

After the material was cooled for handling, the material was placed on high temperature trays with parting material on the sides and bottom of the trays. The material was loosely packed in the trays to a depth of three inches at whatever width was desired upon completion. The kiln was turned on to ramp-up to 500-550° F. in the first hour. The kiln was then regulated to a controlled ramp of 250° F. per hour for 6 hours to an environment temperature of approximately 2000° F. (1903° C.). The kiln was then fired to establish a reducing environment, ultimately taking the environment temperature of the kiln to 2200° F. (1204° C.) to 2600° F. at a rate of 300° F. to 350° F. per hour. When the heat sink temperature of the material was such that it penetrated the surface of the mixture, in the range of approximately 2250° F. (1232° C.) to 2380° F. (1304° C.) (as read by an IR temperature gun, with an emissivity setting of 0.95), the kiln environment temperature was slowed to maintain a constant material and environment temperature at a rise of no more than 25° F. per hour. After about 30 minutes at this kiln environment temperature the material was cooled at a rate to insure appropriate and conventional tempering after which all kiln equipment was turned off and the kiln was allowed to cool for 10-15 hours, or until the interior temperature of the kiln reached about 300° F. (149° C.). The material was then removed and allowed to further cool to room temperature outside of the kiln. The final cooled closed cell ceramic material was then cut or trimmed to the desired dimensions.

EXAMPLE 3

A cellular ceramic material, in particular a closed cell glass ceramic material, of the present disclosure was made by 1) mixing bentonite, carbon and water, 2) mixing volcanic ash, carbon and water, 3) curing the mixtures, 4) drying the cured mixtures, 4) compacting and layering (one on top of the other) the dried mixtures, and 5) then firing the dried, cured, doubled layered, mixtures. In particular, 50 pounds of 325 mesh bentonite were mixed with 1.5% carbon and about 50% to about 60% water per 100 pounds of bentonite. Also, 50 pounds of 325 mesh volcanic ash were mixed with 1.5% carbon and about 50% to 60% water per 100 pounds of volcanic ash. The carbon was mixed in exact proportions into warm water until fully dissolved. This carbon solution was mixed separately with the bentonite and volcanic ash in a fashion to dampen the entire mixture while being agitated and folded. The resultant material mixtures were covered with plastic and allowed to cure overnight.

The cured wet materials were placed in the above-described kiln in separate containers. The kiln temperature was gradually ramped-up from ambient temperature at a rate of 300 degrees per hour (149° C. per hour). When the kiln temperature reached 900° F. (482° C.), the temperature was held for 4 more hours for a total of 7 hours of drying, including ramp-up time before turning off and allowing the material to cool.

After the material was cooled for handling, the bentonite material was placed on high temperature trays with parting material on the sides and bottom of the trays, packed and layered with the volcanic ash. The material was packed in the trays to a total depth of 4 inches (2 inches per layer) at whatever width was desired upon completion. The kiln was turned on to ramp-up to 500-550° F. in the first hour. The kiln was then regulated to a controlled ramp of 250° F. per hour for 6 hours to an environment temperature of approximately 2000° F. (1903° C.). The kiln was then fired to establish a reducing environment, ultimately taking the environment temperature of the kiln to 2200° F. (1204° C.) to 2800° F. (1538° C.) at a rate of 300° F. to 350° F. per hour. When the heat sink temperature of the material was such that it penetrated the surface of the mixture, in the range of approximately 2360° F. (1293° C.) to 2450° F. (1343° C.) (as read by an IR temperature gun, with an emissivity setting of 0.95), the kiln environment temperature was slowed to maintain a constant material and environment temperature at a rise of no more than 25° F. per hour. After about 30 minutes at this kiln environment temperature the material was cooled at a rate to insure appropriate and conventional tempering after which all kiln equipment was turned off and the kiln was allowed to cool for 10-15 hours, or until the interior temperature of the kiln reached 300° F. (149° C.). The material was then removed and allowed to further cool to room temperature outside of the kiln. The final cooled closed cell glass ceramic material consisted of two closed cell materials completely fused together into one material of varying densities. It was then cut or trimmed to the desired dimensions.

The closed cellular ceramic materials of the present disclosure are desirable for use in building construction. The new system of design is based on the hard sciences of structural design. An example is a requirement of steel bars in both tension and compression with beams calculated to be strong in tension and compression, but deflection is far in excess of concrete standards. This calls for steel rebars to bear the loads in compression and tension in order to stiffen the steel. This can allow very light cellulated ceramic, as steel carries the load. Rebars can be up to 4 feet or more apart in long spans and no steel for short spans between the long bars.

The raw materials of cellular ceramics, like those for concrete, are surface (pit mined) materials, abundant in most areas of most states and countries. The cost per ton is intuitively, minimal for either product.

The use of closed cellular ceramic material as a building material provides other advantages as well. For example, cellular ceramic materials require no additional protection from insulation board, or any additional layer of bricks, stucco, or siding to cover the insulation. The new product itself has an R value greater than 0.25 per inch of thickness. The surface, as fired, may give various pleasing looks, or the ceramic timber may be shaped and given stucco effects, or the look of brick and stone, or painted, or given groves and fluting and simulated joints by normal material tooling equipment. When certain materials are layered, they can produce different types of strength, density, R values, and desirable surfaces for many applications.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A method of producing a closed cell ceramic material product comprising the steps of:
   a) providing clay, carbon and water;
   b) mixing the clay, carbon and water to form a mixture of the clay, carbon and water, the water being in an amount of about 40% to about 70% water by weight of the clay in the mixture;
   c) allowing the mixture to cure;
   d) drying the cured mixture;
   e) firing the dried mixture at a temperature and held at the temperature for a period of time sufficient to melt the surface of the mixture; and
   f) cooling the fired mixture to produce the closed cell ceramic material product, wherein the carbon is soluble carbon and the combined total amount of soluble carbon in both the clay and the carbon mixed with the clay is about 0.5% to about 2.5% by weight of the clay without carbon in the mixture.

2. The method of claim 1, wherein the clay is selected from the group of surface clays, ball clays, kaolin, shale and bentonite.

3. The method of claim 1, wherein the carbon is water soluble and will char upon heating.

4. The method of claim 1, wherein the dried mixture includes SiC, and the dried mixture is fired in a reducing environment such that the SiC in the mixture when heated to above 2100° F. up to 2700° F. produces $SiO_2$ and SiO and ½ $O_2$.

5. The method of claim 1, wherein the mixture is allowed to cure for about 4 hours to about 6 hours.

6. The method of claim 5, wherein the cured mixture is dried to bring the water composition in the mixture down to within the range of about 0.5% to about 6% by weight of the mixture.

7. The method of claim 6, wherein the dried mixture is fired at a temperature for a period of time sufficient to sinter the surface of the mixture.

8. The method of claim 1, wherein the cured mixture is dried to bring the water composition in the mixture down to within the range of about 0.5% to about 6% by weight of the mixture.

9. The method of claim 1, wherein the cured mixture is dried at a temperature in the range of about 850° F. to about 1000° F.

10. The method of claim 1, wherein the clay is a bentonite and the upper temperature for the firing of the mixture is in the range of about 2350° F. to about 2550° F.

11. The method of claim 1, wherein the clay is bentonite, fly ash is added to the bentonite, carbon and water to form the mixture, and the upper temperature for the firing of the mixture is in the range of about 2250° F. to about 2380° F.

12. The method of claim 1, wherein the firing of the dried mixture occurs at least part of the time during the firing step in a reducing environment.

13. The method of claim 1, wherein the clay that is provided includes fine mesh clay having a mesh of about 325 or less and the carbon that is provided includes fine mesh carbon having a mesh of about 325 or less.

14. The method of claim 1, wherein the clay is bentonite and a second mixture of volcanic ash, carbon and water is layered with the mixture of bentonite, carbon and water, one mixture layered on top of the other mixture, and the upper temperature for the firing of the mixture is in the range of 2350° F. to 2550° F.

15. The method of claim 13, wherein the clay comprises a combination of different clays and the combination of different clays having a mesh of 325 or less may be layered.

16. The method of claim 1, wherein a closed cell glass ceramic product is produced.

17. A method of claim 1, wherein the clay is selected from the group of surface clays, ball clays, kaolin, shale and bentonite, the cured mixture is dried to bring the water composition in the mixture down to within the range of about 0.5% to about 6% by weight of the mixture, and wherein the upper temperature for the firing of the mixture is in the range of about 2350° F. to about 2550° F.

18. The method of claim 17, wherein the cured mixture is dried at a temperature in the range of about 850° F. to about 1000° F.

19. The method of claim 17, wherein the clay that is provided includes fine mesh clay having a mesh of about 325 or less and the carbon that is provided includes fine mesh carbon having a mesh of about 325 or less.

* * * * *